(12) United States Patent
Higgins

(10) Patent No.: US 6,718,316 B1
(45) Date of Patent: Apr. 6, 2004

(54) NEURAL NETWORK NOISE ANOMALY RECOGNITION SYSTEM AND METHOD

(75) Inventor: Robert C. Higgins, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 603 days.

(21) Appl. No.: 09/678,881

(22) Filed: Oct. 4, 2000

(51) Int. Cl.$^7$ .............................................. G06F 15/18
(52) U.S. Cl. .............................. 706/15; 706/22; 706/25
(58) Field of Search ............................ 706/15, 20, 22, 706/25, 16

(56) References Cited

U.S. PATENT DOCUMENTS

| | | | |
|---|---|---|---|
| 5,583,968 A | * 12/1996 | Trompf | 704/232 |
| 5,683,425 A | * 11/1997 | Hauptmann | 607/9 |
| 2002/0023066 A1 | * 2/2002 | Fu et al. | 706/22 |
| 2002/0029253 A1 | * 3/2002 | Rhoads | 709/217 |
| 2002/0173276 A1 | * 11/2002 | Tschirk | 455/67.3 |

OTHER PUBLICATIONS

Ramamurti et al., "Neural Detectors for Signals in Non-Gaussian Noise", IEEE International Conference on Acoustics, Speech and Signal Processing, vol. 1 pp. 481–484, Apr. 1993.*

Kim, M.W., "Gram–Charlier and Generalized Probablistic Neural Networks Based Radar Target Detection in Non-Gaussian Noise", IEEE National Radar Conference, pp. 183–188, Mar. 1994.*

Jim et al., "An Analysis of Noise in Recurrent Neural Networks: Convergence and Generalization", IEEE Transactions on Neura Networks, vol. 6, No. 6,1996.*

Al–Mashouq, K.A., "Noise Tolerance of Output–Coded Neural Net", Proceedings of the IEEE Digital Signal Processing Workshop, pp. 442–445, Sep. 1996.*

Miguez et al., "Maximum Likelihood Blind Source Separation in Gaussian Noise", Proceedings of the 1999 IEEE Signal Processing Society Workshop, pp. 343–352, Aug. 1999.*

Gandhi et al., "Neural Networks for Signal Detection in Non–Gaussian Noise", IEEE Transactions on Signal Processing, vol. 45 Iss. 11, pp. 2846–2851, Nov. 1997.*

Yin et al., "Neural Filters: A Class of Filters Unifying FIR and Median Filters", IEEE International Conference on Acoustics, Speech and Signal Processing, vol. 4, pp. 53–56, Mar. 1992.*

(List continued on next page.)

Primary Examiner—Wilbert L. Starks, Jr.
Assistant Examiner—Kelvin Booker
(74) Attorney, Agent, or Firm—James M. Kasischke; Michael F. Oglo; Jean-Paul A. Nasser

(57) ABSTRACT

A system and method for a neural network is disclosed that is trained to recognize noise characteristics or other types of interference and to determine when an input waveform deviates from learned noise characteristics. A plurality of neural networks is preferably provided, which each receives a plurality of samples of intervals or windows of the input waveform. Each of the neural networks produces an output based on whether an anomaly is detected with respect to the noise, which the neural network is trained to detect. The plurality of outputs of the neural networks is preferably applied to a decision aid for deciding whether the input waveform contains a non-noise component. The decision aid may include a database, a computational section and a decision module. The system and method may provide a preliminary processing of the input waveform and is used to recognize the particular noise rather than a non-noise signal.

24 Claims, 1 Drawing Sheet

OTHER PUBLICATIONS

Kasabov et al., "Hybrid System for Robust Recognition of Noisy Speech Based on Evolving Fuzzy Neural Networks and Adaptive Filtering", vol. 5, pp. 91–96, Jul. 2000.*

Potamitis et al., "Impulsive Noise Suppression Using Neural Networks", IEEE International Conference on Acoustics, Speech and Signal Processing, vol. 3, pp. 1871–1874, Jun. 2000.*

Moon et al., "Coordinated Training of Noise Removing Networks", IEEE International Conference on Acoustics, Speech, and Signal Processing, vol. 1, pp. 573–576, Apr. 1993.*

Yin et al., "Adaptive Neural Filters", Proceedings of the 1991 IEEE Workshop on Neural Networks for Signal Processing, pp. 503–512, Oct. 1991.*

Van–Houtte et al., "Passisve Sonar Processing Using Neural Networks", IEEE International Joint Conference on Neural Networks, vol. 2, pp. 1154–1159, Nov. 1991.*

Mahan et al., "Adaptive Filtering for Band–limited Noise Using an Error Backpropagation Neural Network", $9^{th}$ IEEE Instrumentation and Measurement Technology Conference, pp. 508–511, May 1992.*

Guillerm et al., "Neural Networks in Noisy Environment: A Simple Temporal Higher Order Learning For Feed–Forward Networks", International Joint Conference on Neural Networks, vol. 3, pp. 105–112, Jun. 1990.*

Solka et al., "Signal Processing With Neural Networks", International Joint Conference on Neural Networks, vol. 2, p. 609, Jun. 1989.*

Suetake et al., "Neo Fuzzy Neuron Filter Aiming at Reduction of a Gaussian–Impulsive Noise", International Joint Conference o Neural Networks, vol. 6, pp. 4324–4328, Jul. 1999.*

* cited by examiner

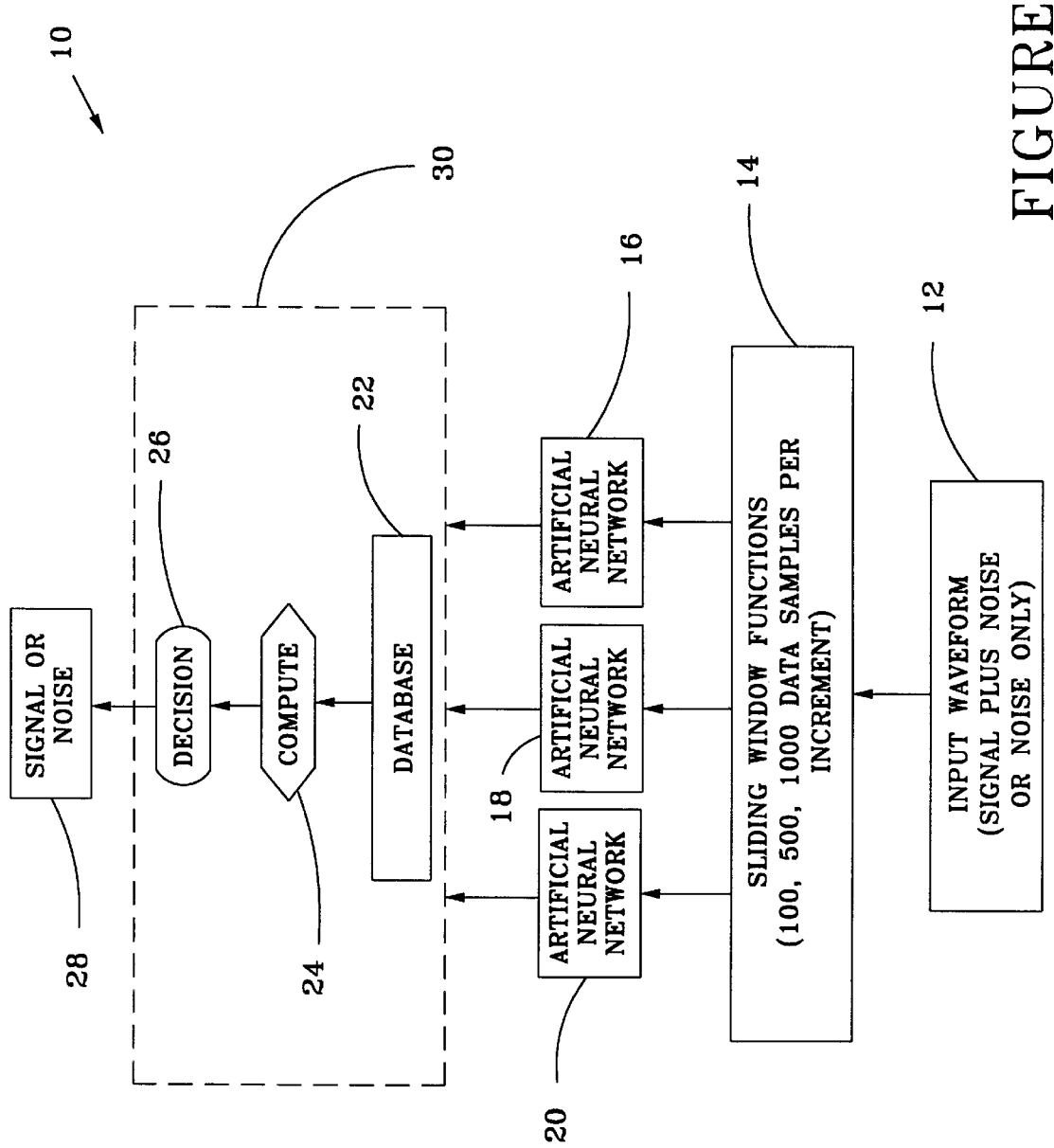

NEURAL NETWORK NOISE ANOMALY RECOGNITION SYSTEM AND METHOD

STATEMENT OF THE GOVERNMENT INTEREST

The invention described herein may be manufactured and used by or for the Government of the United States of America for Governmental purposes without the payment of any royalties thereon or therefore.

BACKGROUND OF THE INVENTION

(1) Field of the Invention

The present invention relates generally to signal processing and, more specifically, to a neural network trained to determine when an input deviates from pure noise characteristics.

(2) Description of the Prior Art

Prior art signal processors attempt to detect the presence of an object by filtering out background noise and applying detection techniques. These detectors try to identify whether a signal is embedded in background noise by comparing, for example, the received waveform with a model of the signal to see if there is any correlation. One disadvantage with these techniques is that the transmitted signal may become distorted because the amplitude, phase and frequency characteristics of the transmitted signal are adversely affected as the signal propagates through the medium. Hence, detection performance decreases. Such signal distortion may occur in an environment where a sinusoidal pulse impacts an object, traverses multiple paths and combines in an unfavorable manner at the receiver array. In an underwater acoustic environment, for instance, an adverse multipath effect occurs when multiple reflected signals propagate through the ocean after a transmitted signal has impacted an underwater object like another vehicle. Multipath effects are also present in most types of radio and wireless communications resulting in reduced detectability.

Artificial neural networks (ANN) are commonly referred to as neural networks or neural nets. Neural networks may typically be comprised of many very simple processors, commonly referred to as units or neurons, each normally having an allocated amount of local memory. The units may typically be connected by unidirectional communication channels or connections, which may carry numeric as opposed to symbolic data. The units operate only on their local data and on the inputs they receive via the connections. An artificial neural network is a processing device, either software or actual hardware, whose design was inspired by the design and functioning of neural networks such as biological nervous systems and components thereof. Most neural networks have some sort of training rule whereby the weights of connections may be adjusted on the basis of presented patterns. Neural networks learn from examples, just like children learn to recognize dogs from examples of dogs, and exhibit some structural capability for generalization. The term "neural net" should logically, but in common usage never does, also include biological neural networks, whose elementary structures are far more complicated than the mathematical models used for ANNs.

The patents discussed below describe use of a neural network to act as a detector wherein an attempt is made to recognize a signal pattern within noise.

U.S. Pat. No. 5,402,520, issued Mar. 28, 1995, to B. Schnitts, discloses an apparatus for retrieving signal embedded in noise and analyzing the signals. The apparatus includes an input device for receiving input signals having noise. At least one filter retrieves data signals embedded in the input signals. At least one adaptive pattern recognition filter generates coefficients of a polynomial expansion representing the pattern of the filtered data signals. A storage device stores the coefficients generated. It is determined when an event has occurred, the event being located at any position within the data signals. An adaptive autoregressive moving average pattern recognition filter generates coefficients of a polynomial expansion representing an enhanced pattern of filtered data signals. At least one weighting filter compares the stored patterns with the enhanced pattern of data signals. The neural network is trained to recognize and predict signal patterns within noise as discussed above, e.g., stock price patterns, rather than to recognize noise itself.

U.S. Pat. No. 5,778,152, issued Jul. 7, 1998, to Oki et al., discloses a neural network designed to recognize a particular character. The network is supplied with initial tap weights for a first hidden node, which are an image of the character to be recognized. The additive inverse of this set of weights is used as the tap weights for a second hidden node. A third node, if used is initialized with random noise. The network is then trained with back propagation. The neural network is trained to recognize signal patterns within noise, e.g., letters, rather than to recognize noise itself.

The above patents do not address the value or approach of recognizing noise itself. For certain types of waveforms, particularly those which may or may not contain a signal embedded in noise, this type of information is especially useful for efficient detection. Consequently, it would be desirable to provide a neural network trained to detect noise and programmed to indicate if any non-noise anomalies are present. Those skilled in the art will appreciate the present invention that addresses the above and other needs and problems.

SUMMARY OF THE INVENTION

Accordingly, it is an object of the present invention to provide an improved signal detector.

It is yet another object of the present invention to provide a means for determining the presence or absence of a non-noise component within noise.

These and other objects, features, and advantages of the present invention will become apparent from the drawings, the descriptions given herein, and the appended claims.

In accordance with the present invention, a method is provided for determining the presence or absence of a non-noise anomaly within noise by processing a received waveform including steps such as producing a plurality of samples of the received waveform and applying the plurality of samples to one or more initial neural networks. Each of the one or more initial neural networks may be trained to recognize noise. The initial neural networks produce one or more respective outputs related to the presence or absence of the non-noise anomaly. Another step includes analyzing the one or more respective outputs of the one or more initial neural networks to determine if the non-noise anomaly is present in the received waveform. The step of analyzing may further comprise applying the one or more outputs to a decision making circuit for determining if a non-noise anomaly is present in the received waveform.

The step of producing a plurality of samples may further comprise dividing the received waveform into one or more windows whereupon the received waveform within each of the one or more windows is sampled and applied to a respective one of the one or more initial neural networks. The one or more windows may be incremented so as to slide relative to the received waveform with each increment such that the windows are incremented until all of the received waveform is sampled. Another step may include storing the respective outputs from the one or more initial neural networks in a database.

In one example, the initial neural networks are trained to recognize Gaussian noise. The step of analyzing may include calculating standard deviations related to the respective outputs.

The anomaly recognition system of the present invention comprises a plurality of initial neural networks, wherein each of the plurality of initial neural networks may be programmed for recognizing noise. The plurality of initial neural networks may produce a respective plurality of outputs related to the presence or absence of a non-noise anomaly. A decision making aid is preferably provided for receiving and evaluating the plurality of outputs from the neural networks. The decision making aid may be programmed to determine if a non-noise element is present or not after analyzing the plurality of outputs. The system may further comprise a plurality of sampling members for providing a plurality of samples of the received waveform for each of the plurality of initial neural networks. In a preferred embodiment, each of the plurality of sampling members is operable for sampling a selected interval of the received waveform. The decision making aid preferably comprises a decision module and a database for storing the outputs of the initial neural networks.

Thus, in operation one or more initial neural networks are trained to recognize the noise element. The received waveform is sampled prior to filtering out the relevant noise element to produce one or more samples for the one or more initial neural networks. The samples are applied to the one or more initial neural networks for detecting the noise element. The initial neural networks produce one or more outputs responsive to the noise element. A decision making aid preferably receives the one or more outputs, stores and analyzes the outputs to produce a decision as to the presence or absence of a noise anomaly.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing, wherein the Figure is a schematic block diagram representation of a noise anomaly recognition system or an initial or early stage of a signal processing detector in accord with the present invention.

BRIEF DESCRIPTION OF THE PREFERRED EMBODIMENTS

Referring now to the Figure, there is shown a noise anomaly recognition system 10 arranged for use as a neural network noise anomaly recognition system in accord with the present invention. One object of the invention is to recognize when a signal or non-noise component is embedded in noise. However, recognition system 10 is not designed to recognize the signal, which may or may not be present in noise, but instead is designed to recognize noise or interference. Recognition system 10 may be employed to enhance signal detection in high noise or high interference environments such as high interference acoustic environments as may occur in sonar applications, in medical applications that require a high degree of detection capabilities, and in wireless communications. Recognition system 10 employs one or more neural networks which can be trained to recognize particular noise characteristics or other types of interference to determine when the input or received signal deviates from the learned noise characteristics. Additional processing may be used in conjunction with recognition system 10 to identify specific characteristics of any non-noise components.

Referring to the figure, input waveform 12 may be a waveform received by anomaly recognition system 10 which typically includes noise, interference, or distortion of various types, e.g., reverberation, and may or may not include a signal that contains intelligence or is intentionally produced for some purpose. The input or received waveform 12 is then preferably sampled by one or more sampling devices for initial processing by artificial neural networks such as artificial neural networks 16, 18 and 20. In a preferred embodiment, the received waveform is divided into partitions or windows as indicated at 14 and each sampling member samples the portion of input or received waveform 12 in a particular window. The window sizes may be varied depending on the application and the example shown in the figure may use windows of 100, 500 and 1000 samples. If the initially selected windows do not cover the entire waveform, sliding windows of the data of received or input waveform 12 may be used. In this case, after data sampling of the input waveform 12 is performed in accordance with optimum sampling criteria, the sliding windows of data are processed by neural networks, such as 16, 18 and 20, until all input data is processed. Preferably the neural networks, such as 16, 18 and 20, will be designed to accept multiple input samples (window sizes). For example, in the figure the three networks 16, 18 and 20, accept 100, 500 and 1000 samples per window. In a preferred embodiment, each window will correspond to a particular artificial neural network and the artificial neural network will process each increment of the corresponding sliding window to produce a number between 0 and 1. The number of samples per window and the number of neural networks may be changed during the training process to optimize neural network performance. Furthermore, if the neural network is a 3-layer backscatter model, then the number of intermediate level neurons in each neural network may be varied for optimum performance. Preferably, input waveform 12 is not filtered so as to affect the particular type of noise for which the networks are trained.

Neural networks, such as networks 16, 18 and 20, may be trained beforehand to recognize noise, for instance white Gaussian noise, and to produce a binary output of 1 when the input is white Gaussian noise in this example and 0 when it deviates from this. Thus, a 0 is output if there is a signal present that does not depict the random characteristics of noise. Although the neural networks may be trained to recognize white Gaussian noise in this example, if the noise characteristics of a particular application are different, then the neural networks may be trained on noise with different characteristics.

For instance, the neural networks could recognize the characteristics of a dominant interference like reverberation, identify when the input characteristics are different from what it has been trained to recognize, and provide an alert when this happens. As an example, when an underwater array receives a multipath signal embedded in noise that results from an active sonar transmission, the neural network would recognize this as a non-noise anomaly if no other signals were present. Also, when operating as a passive sonar (i.e., listening only), anomaly recognition system 10 may recognize the presence of transmissions that may originate with other underwater vehicles.

The outputs of the neural networks, such as 16, 18 and 20 are preferably applied to decision aid 30 which preferably comprises database 22, computational section 24 and decision module 26 to produce an output of whether or not the received waveform 12 is noise or includes a non-noise component as indicated at 28. Database 22 may preferably be used to store the output sets of the artificial neural networks as the sliding windows are incremented to completely process input waveform 12. Computational section 24 may be used to calculate the mean and standard deviation or other statistical/descriptive criteria for each of the output sets produced by the one or more artificial neural networks such as the three networks 16, 18 and 20 shown in the figure. The decision module 26 may preferably be used to select the output set with the least volatility (smallest standard deviation) and determine if the mean is closer to 1 (white Gaussian noise only), or to 0 (non-noise component present). Decision aid 30 then preferably produces a binary output of 1 or 0 to indicate the decision.

In summary, neural networks 16, 18 and 20 are trained to identify noise, e.g., white Gaussian noise, instead of being trained to recognize a signal within the noise. Since the parameters that characterize a transmitted signal may change due to the deleterious effects of the environment, it is believed to be advantageous and in accord with the present invention to train neural networks 16, 18 and 20 on noise and recognize when input waveform 12 is different from noise. In accordance with the present invention, this method of operation is advantageous over training the neural network to recognize the specific signal which may be very distorted. In a multipath environment where cloud layers or ocean boundaries may cause signal distortion, the approach of the present invention may be of particular value. Sliding windows 14 may be applied to sections of input waveform 12 at the same time to produce output sets for storage in database 22. Each time the windows are incremented or slide, samples are taken and processed to produce a new output set. Computations are made on each output set and a decision is made.

Alternative system structures and procedures could be used. For instance, expanded or contracted window sizes that include more or less data samples could be provided. A different neural network model than that shown in the figure may be utilized. Anomaly recognizing system 10 may be trained to recognize noise only, interference only, or a combination of these or other types of noise. Decision aid 30 may be constructed differently as desired. For instance, database 22 may be used to store processed results from the artificial networks instead of output sets directly from the artificial networks. The decision elements of decision aid 30 may be a digital expert system or other digital computing elements.

Thus, numerous variations of the above method are possible, some of which have already been described. Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A computer implemented method for determining the presence or absence of a non-noise anomaly within noise by processing a received waveform, said method comprising:

producing a plurality of samples of said received waveform;

applying said plurality of samples to one or more initial neural networks, each of said one or more initial neural networks being trained to recognize noise and only noise, said one or more initial neural networks producing one or more respective outputs related to said presence or absence of said non-noise anomaly; and analyzing said one or more respective outputs of said one or more initial neural networks to determine if said non-noise anomaly is present in said received waveform.

2. The method of claim 1, wherein said analyzing further comprises applying said one or more outputs to a decision making circuit for determining if a non-noise anomaly is present in said received waveform.

3. The method of claim 2, wherein applying outputs to a decision making circuit further comprises:

storing said respective outputs as data sets in a database;

calculating statistical criteria for each of said data sets; and selecting the data set having statistical criteria most determinative of said non-noise anomaly being present.

4. The method according to claim 3, wherein the statistical criteria is standard deviation.

5. The method of claim 1, wherein said producing a plurality of samples further comprises dividing said received waveform into one or more windows, said received waveform within each of said one or more windows being sampled and applied to a respective one of said one or more initial neural networks.

6. The method of claim 5, further comprising said one or more windows being incremented so as to slide relative to said received waveform with each increment.

7. The method of claim 6, further comprising said one or more windows being incremented until all of said received waveform is sampled.

8. The method of claim 1, further comprising said initial neural networks being trained to recognize Gaussian noise.

9. The method of claim 1, further comprising storing said respective outputs from said one or more initial neural networks in a database.

10. The method of claim 1, wherein said analyzing includes calculating standard deviations related to said respective outputs.

11. A detector for a received waveform, comprising:

a plurality of initial neural networks, each of said plurality of initial neural networks being programmed for recognizing noise, said plurality of initial neural networks producing a respective plurality of outputs related to the presence or absence of a non-noise anomaly; and a decision making aid for receiving said plurality of outputs, said decision making aid being programmed to determine if a non-noise element is present or not from said plurality of outputs.

12. The detector of claim 11, further comprising a plurality of sampling members for providing a plurality of samples of said received waveform to each of said plurality of initial neural networks.

13. The detector of claim 12, wherein each of said plurality of sampling members is operable for sampling a selected interval of said received waveform.

14. The detector of claim 11, wherein said decision making aid comprises:

a database module storing each of said plurality of outputs as data sets;

a calculation module obtaining the standard deviation of the data sets; and a detection module selecting the data set having the least standard deviation for comparison with a non-noise element.

15. The detector of claim 11, wherein said initial neural networks are programmed for a specific selected noise structure.

16. The detector of claim 11, further comprising a database within said decision making aid.

17. A computer implemented method for processing a received waveform containing a noise element, said method comprising:

training one or more initial neural networks to recognize said noise element and only said noise element;

sampling said received waveform prior to filtering out said noise element to produce one or more samples for said one or more initial neural networks;

applying said one or more samples to said one or more initial neural networks for detecting said noise element; and producing one or more outputs responsive to said noise element.

18. The method of claim 17, wherein said producing one or more outputs further comprises producing one or more outputs relative to a presence of anomaly with respect to said noise element.

19. The method of claim 17, further comprising applying said one or more outputs to a decision making aid for determining whether an anomaly to said noise element is detected.

20. The method of claim 19, further comprising producing a single digit binary digital signal responsive to said presence or absence of said anomaly.

21. The method of claim 19 wherein applying said one or more outputs to a decision making aid further comprises:

storing each of said one or more output as data sets in a database;

calculating statistical criteria for each of said data sets; and selecting the data set having statistical criteria most determinative of said anomaly being present.

22. The method according to claim 21, wherein the statistical criteria is standard deviation.

23. The method of claim 17, further comprising dividing said received waveform into one or more windows.

24. The method of claim 23, wherein said sampling further comprises sampling said windows of said received signal such that each window corresponds to each of said one or more initial neural networks.

* * * * *